Dec. 8, 1953
P. KOLBET
2,661,844
DAIRY CONTAINER SEDIMENT TRAP
Filed Jan. 5, 1950
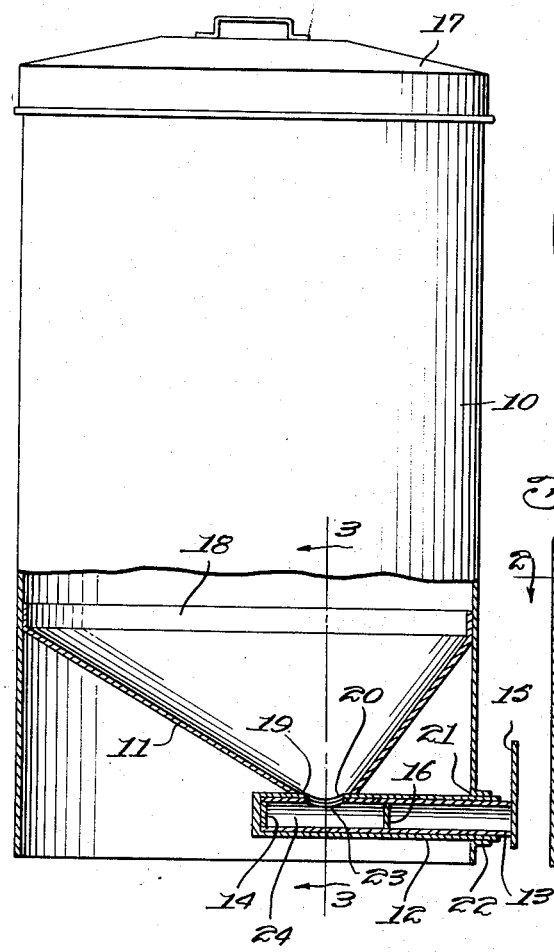
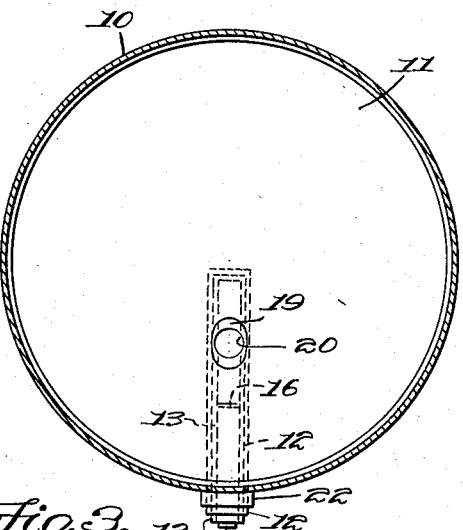
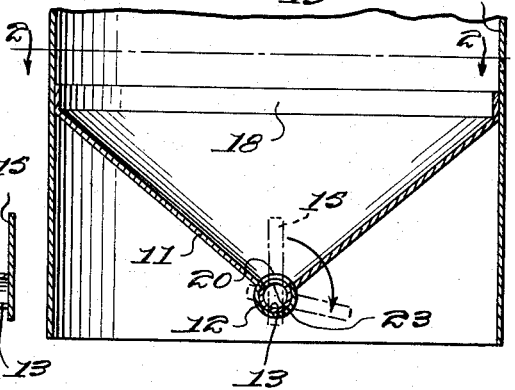
INVENTOR.
Paul Kolbet,
BY Victor J. Evans & Co.
ATTORNEYS Patented Dec. 8, 1953

2,661,844

UNITED STATES PATENT OFFICE 2,661,844

DAIRY CONTAINER SEDIMENT TRAP

Paul Kolbet, Cresco, Iowa

Application January 5, 1950, Serial No. 137,008

1 Claim. (Cl. 210—57)

This invention relates to devices for removing sediment from containers particularly milk and cream cans in which milk or cream remains overnight for cooling, and in particular a cream can having a conical shaped lower end with a tube extended from the vertex of the cone to the outer wall of the container and an inner tube with a pocket in the inner end thereof slidable in the former tube and provided with an opening that registers with a corresponding opening in the former tube whereby sediment collecting in the lower end of the tank or can settles into the pocket in the inner end of the inner tube.

The purpose of this invention is to provide means in a cream or milk can whereby sediment from the contents of the can may be trapped while cream or milk is poured from the can and in which the sediment may readily be removed after the cream or milk is removed from the can.

Various devices have been provided for collecting sediment in the lower end of cans and other containers and even though some are provided with valves these devices do not provide means for trapping sediment as products are poured from the can or container and wherein the sediment may be removed after products are poured from the container. With this thought in mind this invention contemplates a combination of tubes in the lower end of a container with openings through the walls of the tubes communicating with the interior of the container and wherein an inner tube may be rotated to close the openings for trapping sediment therein as products are poured from the container.

The object of this invention is, therefore, to provide a trap for receiving and holding sediment in the lower end of the container wherein the trap may be closed with the container full or partly filled whereby products may be poured from the container with the sediment retained in the trap.

Another object of the invention is to provide a sediment trap for cream and other containers wherein the entire trap is readily removable for cleaning after products in the container have been removed therefrom.

A further object of the invention is to provide a sediment trap for cream cans and other similar containers which is of a simple and economical construction.

With these and other objects and advantages in view the invention embodies a cylindrical can having a conical shaped false bottom spaced above the lower end of the can with an outer tube having an opening in the upper surface registering with the interior of the can and an inner tube having a handle on the outer end, a closed inner end and a partition spaced from the inner end slidably mounted in the outer tube and having an opening in the wall thereof providing communicating means with the area between the partition and inner end and interior of the container through the opening in the wall of the outer tube.

Other features and advantages of the invention will appear from the following description taken in connection with the drawings wherein:

Figure 1 is a view showing a side elevation of the improved cream can with the lower part broken away and shown in section.

Figure 2 is a sectional plan through the container taken on line 2—2 of Figure 3.

Figure 3 is a vertical section through the lower end of the container taken on line 3—3 of Figure 1.

Referring now to the drawing wherein like reference characters denote corresponding parts the improved sediment removing cream and milk can of this invention includes a container 10 having a conical shaped false bottom 11 therein, an outer tube 12 and an inner tube 13 which is formed with a closed inner end 14, a handle 15 on the outer end and a partition 16 intermediate of the ends.

The container 10 may be cylindrical or of any suitable shape and a cover 17 may be provided on the upper end. The conical shaped false bottom 11 is provided with a flange 18 by which it is secured to the inner surface of the wall of the container 10 and the lower part thereof is provided with an opening 19 through which the outer tube 12 extends and the tube 12 is provided with an opening 20 that provides communicating means between the interior of the tube and the interior of the container 10 through the opening 19. The tube 12 extends through an opening 21 in the wall of the container 10 and a flange 22 may be provided around the opening to facilitate installing the tube 12 therein.

The tube 13 is slidably mounted and also adapted to rotate in the tube 12 and an opening 23 in the wall of the tube 13 is positioned to register with the opening 20 of the tube 12 with the tube 13 inserted in the tube 12, as shown in Figure 1.

With the parts formed in this manner and with the handle 15 on the outer end of the tube 13 extended upwardly, a pocket 24 in the inner end of the tube 13 is in communication with the interior of the can 10 and sediment in products in the can drops through the openings 20 and 23 into the pocket 24. When it is desired to remove the cream or milk from the can the handle 15 is turned through an angle of approximately 90°, as illustrated in Figure 3 whereby the opening 23 moves away from the opening 20 so that the pocket 24 is closed. With the parts in this position cream or milk may be poured from the can 10 and the small amount with sediment collected from the milk or cream is trapped in the pocket 24. After milk or cream is removed the tube 13 may be withdrawn and the pocket flushed or thoroughly cleaned and sterilized.

It is the usual practice to place cream in a can such as the container 10 where it remains overnight for cooling and by this means sediment is trapped in the pocket 24 so that when the cream is poured from the can the next morning for transportation the sediment remains in the pocket.

It will be understood that modifications may be made in the design and arrangement of the parts without departing from the spirit of the invention.

What is claimed is:

A dairy can sediment trap comprising an outer tube positioned below the lower end of the can, said outer tube having an opening therein providing communicating means between the interior of the tube and interior of the can and positioned to receive sediment collecting in the lower end of the can, and a removable inner tube having a pocket in the inner end with an opening through the wall thereof positioned to register with the opening in the outer tube and through which sediment from the can may pass into the said pocket, said inner tube adapted to be rotated to close the opening in the wall thereof for trapping sediment collected in the pocket, said can having a conical shaped false bottom with the false bottom providing the lower end of the can and with the opening in the said outer tube positioned in the vertex of the said false bottom.

PAUL KOLBET.

References Cited in the file of this patent

UNITED STATES PATENTS

| Number | Name | Date |
|---|---|---|
| 306,169 | Moseley | Oct. 7, 1884 |
| 306,170 | Moseley | Oct. 7, 1884 |
| 642,503 | Steffee | Jan. 30, 1900 |
| 643,651 | Heylman | Feb. 20, 1900 |
| 1,131,243 | Hughes | Mar. 9, 1915 |
| 1,165,508 | Irish | Dec. 28, 1915 |
| 1,496,160 | Marsh | June 3, 1924 |
| 1,741,915 | Brasack et al. | Dec. 31, 1929 |
| 1,945,849 | Ferrandino | Feb. 6, 1934 |

FOREIGN PATENTS

| Number | Country | Date |
|---|---|---|
| 294,541 | Germany | Oct. 13, 1916 |
| 378,998 | Italy | Mar. 2, 1940 |